(12) United States Patent
Mombrinie

(10) Patent No.: US 12,252,269 B2
(45) Date of Patent: Mar. 18, 2025

(54) URBAN AIR MOBILITY CARGO MODULE SWAPPING SYSTEM

(71) Applicant: Bruno Mombrinie, Forestville, CA (US)

(72) Inventor: Bruno Mombrinie, Forestville, CA (US)

( * ) Notice: Subject to any disclaimer, the term of this patent is extended or adjusted under 35 U.S.C. 154(b) by 258 days.

(21) Appl. No.: 17/753,965

(22) PCT Filed: Sep. 22, 2020

(86) PCT No.: PCT/US2020/070561
§ 371 (c)(1),
(2) Date: Mar. 18, 2022

(87) PCT Pub. No.: WO2021/062434
PCT Pub. Date: Apr. 1, 2021

(65) Prior Publication Data
US 2022/0371746 A1 Nov. 24, 2022

Related U.S. Application Data

(60) Provisional application No. 62/904,328, filed on Sep. 23, 2019.

(51) Int. Cl.
*B64F 1/32* (2006.01)
*B64C 1/20* (2006.01)
(Continued)

(52) U.S. Cl.
CPC .............. *B64F 1/322* (2020.01); *B64C 1/20* (2013.01); *B64U 10/25* (2023.01); *G05D 1/0094* (2013.01);
(Continued)

(58) Field of Classification Search
CPC .. B64C 1/22; B64C 29/00; B64C 1/20; G05D 1/0094; B64U 2201/10; B64F 1/322
See application file for complete search history.

(56) References Cited

U.S. PATENT DOCUMENTS 10,216,865 B1 * 2/2019 Theobald ................ G06F 30/00
10,287,011 B2   5/2019 Wolff et al.
(Continued)

FOREIGN PATENT DOCUMENTS

DE          4311679 A1    10/1994
DE     102004034684 A1     2/2006
(Continued)

OTHER PUBLICATIONS

Extended European Search Report; Application No. 20868881.2-1004 / 4034464 PCT/US2020070561.

*Primary Examiner* — Hitesh Patel
*Assistant Examiner* — Luke Huynh
(74) *Attorney, Agent, or Firm* — Andrew F. Young, ESQ.; NOLTE LACKENBACH SIEGEL

(57) ABSTRACT

A cargo module swapping system for an electronic short take-off and landing aerial vehicle, including an autonomously driven robotic vehicle for transporting and swapping cargo modules on an autonomous electric aircraft. The robotic vehicle has two or more robotic arms for controlled material handling and manipulation, each configured to install, remove, and replace cargo bins directly onto the aft end of a forward portion of a central fuselage of an electric short take-off and landing (ESTOL) aircraft. The cargo bins are configured to function as the aft portion of the aircraft central fuselage.

14 Claims, 8 Drawing Sheets

(51) Int. Cl.
*B64U 10/25* (2023.01)
*G05D 1/00* (2006.01)
*B64U 101/64* (2023.01)

(52) U.S. Cl.
CPC ...... *B64U 2101/64* (2023.01); *B64U 2201/10* (2023.01)

(56) References Cited

U.S. PATENT DOCUMENTS

2018/0118476 A1* 5/2018 Bastian, II ........... B65G 41/001
2019/0233107 A1* 8/2019 Tian ..................... B64C 39/12
2019/0276129 A1* 9/2019 Morgan ................ B64U 70/80

FOREIGN PATENT DOCUMENTS

| FR | 3070367 A1 | 3/2019 |
| WO | 2004078588 A1 | 9/2004 |
| WO | 2018213190 A1 | 11/2018 |

* cited by examiner

URBAN AIR MOBILITY CARGO MODULE SWAPPING SYSTEM

BACKGROUND OF THE INVENTION

Technical Field

The present invention relates generally to fixed wing aircraft, and more particularly to an electrically powered fixed wing aircraft, still more particularly to an STOL electric aircraft suitable for extremely short field takeoffs and landings in an urban environment, yet more particularly to an autonomous robotic cargo bin swapping system for use with an ESTOL aircraft.

Background Discussion

Metropolitan parcel transport involves the movement of goods from "warehouse to warehouse." In "warehouse to warehouse" transport, the primary warehouses are mega-fulfillment centers located in outlying rural counties. Secondary, smaller warehouses are delivery depots closer to urban centers. Last mile deliveries originate from these depot locations. And as is well known, the final leg of the journey—ground delivery to final destination—is the most expensive segment for the vast majority of shipments. Accordingly, the more closely delivery depots can be located to densely populated areas, the more efficiently and economically parcels can be delivered.

Medical care facilities present a special need for rapid delivery of parcels. Hospitals, surgery centers, urgent care clinics, and affiliated support facilities need rapid and reliable parcel transport. Medical packages are small, expensive, and required on short notice. Moreover, they are voluminous. A typical hospital has as many barcode SKUs as a supermarket: nearly 50,000. In surgery centers and surgical hospitals, the supply chain can account for 40 percent of expenses. Most hospitals are located in densely populated urban areas where space is at a premium and storage is minimal.

Furthermore, medical care centers cannot accurately anticipate the inventory of particular supplies needed each day. Thus, there is a practice of using on demand express shipping for such facilities. Shipping costs for this industry are overwhelmingly dominated by expensive express delivery. In a typical urban environment, packages are flown from an outlying fulfillment warehouse to a delivery depot at one of potentially several airports and airfields in the metropolitan area. From there, compact city vans are loaded to deliver the packages to a final destination (last-mile delivery). Healthcare facilities tend to be congregated in close proximity to one another, making ground deliveries relatively efficient and economical.

With the addition of a single well-placed skyport utilizing the ESTOLs of the present invention and serving an urban area, a high percentage of healthcare facilities can be placed in a short range of a same-day service air delivery depot.

The economic viability of an urban air mobility ("UAM") system, whether passenger or cargo, is full utilization. Realizing that objective in turn depends upon high arrival and departure rates, fast turnaround times, and fast cruise speeds, which further depends upon the use of smart systems and robotics. Even more, full utilization depends upon use for both passenger and cargo transport. The vehicle ideally suited for a UAM system is described in the related applications. Embodiments of a robotic cargo module swapping system needed to exploit that aircraft for cargo transport are described herein.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

DISCLOSURE OF THE INVENTION

Passenger models of ESTOL aircraft are intended for use in crowded urban environments, and may be suited for use on building rooftop skyports. See, for instance, the ESTOL aircraft described in International Patent Applications WO 2018/213190 and WO 2020117692, each by the present inventor and suited for use with the cargo swapping system of the present invention.

The present invention is a system utilizing autonomously driven cargo module swapping robots intended for use with the same type of ESTOL, but on ground-based airfields, rather than rooftop skyports. The vehicle includes a self-propelled modular transporter with robotic arms for controlled material handling and manipulation to install, remove, and replace cargo bins directly into and onto an ESTOL aircraft. The preference for (or particular suitability of) ground-based airfields for a system utilizing the inventive vehicles is simply owing to the fact that urban parcels as cargo are not, by their very nature, efficiently packed into high rise office buildings for movement within the building; nor are they efficiently first transported vertically within a building for purposes of later transport horizontally. Stated somewhat differently, it makes little sense to transfer urban parcels from ground-based transport (ships, trains, trucks, cars), then place the parcels into elevators, transfer them to planes, and then reverse the entire process upon delivery. The elevator steps are needless and wasteful. Accordingly, this system expands and extends optimal use of autonomous (i.e., pilotless) ESTOL of an urban air mobility system to an urban parcel transport environment, preferably based on the use of ground-level airfields.

As noted, in congested cities, last-mile delivery of parcels is typically accomplished using a relatively compact city van. The UAM system of the present invention, and even more particularly, the cargo bin swapping system of the present invention, is expressly designed to facilitate rapid handling of a "complete load" for two city vans. The UAM aircraft has two cargo bins, one for each van. When a city van goes out for delivery with a typical mix of boxes, pouches and envelopes, a complete load is equal to approximately 150 parcels. To minimize shipping costs, handling is minimized. The majority of loads can be pre-sorted at the fulfillment center, thereby allowing for minimal sorting or handling at the delivery depot. At the delivery depot, the packages are simply transferred from a bin to a city van. The maximum number of parcels are arranged and organized for a route and quickly accessible for delivery.

The UAM cargo system of the present invention is specifically engineered for parcel transport and offers substantial savings and improved service to the healthcare industry. Calculations showing commercial and economic viability are based on offering "same day service at half the price of overnight." The advantages are clear.

In embodiments, the present invention provides a new and improved material handling cargo module (cargo bin) swapping system using autonomously controlled and driven robots to swap incoming cargo bins with outgoing cargo bins in an ESTOL aircraft.

In further embodiments, the present invention provides a material handling cargo module swapping system that enables a cargo module swap in under one minute, thereby enabling aircraft turnaround time (landing, through module swap, to takeoff) in under seven minutes.

Yet other embodiments provide a material handling cargo module swapping system that eliminates damage to cargo and material handling equipment due to human error.

From the foregoing, it may be seen that in its most essential embodiments, the present invention is a cargo module swapping system for an electronic short take-off and landing aerial vehicle, which includes an autonomously driven robotic vehicle for transporting and swapping cargo modules on an autonomous electric aircraft, the robotic vehicle having robotic arms for controlled material handling and manipulation and configured to install, remove, and replace cargo bins directly onto the aft end of a forward portion of a central fuselage of an electric short take-off and landing (ESTOL) aircraft, wherein the cargo bins are configured to function as the aft (rear) portion of the central fuselage Other novel features characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

BRIEF DESCRIPTION OF THE DRAWINGS

The invention will be better understood and objects other than those set forth above will become apparent when consideration is given to the following detailed description thereof. Such description makes reference to the annexed drawings wherein.

The invention will be better understood and objects other than those set forth above will become apparent when consideration is given to the following detailed description thereof. Such description makes reference to the annexed drawings wherein.

BEST MODE FOR CARRYING OUT THE INVENTION

Figure 1:
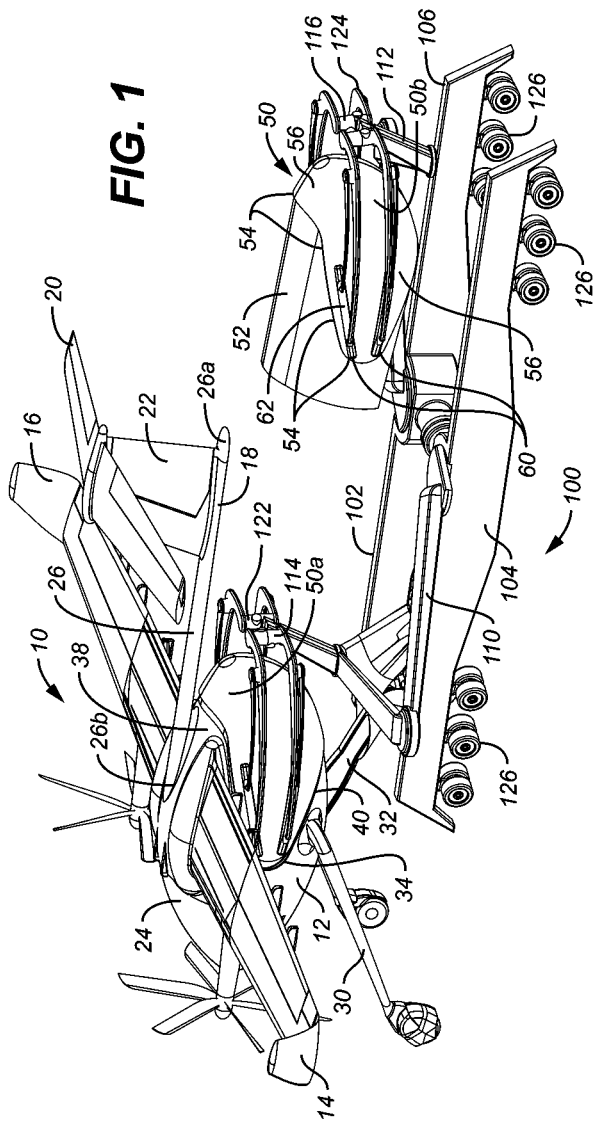
FIG. 1 is an upper left rear perspective view showing the cargo bin swapping system of the present invention in operation, viz., positioned immediately behind the aft portion of the ESTOL fuselage and straddling the single rear landing gear strut and configured to remove a bin from an aircraft and to replace the removed bin with a second bin.
Figure 2:
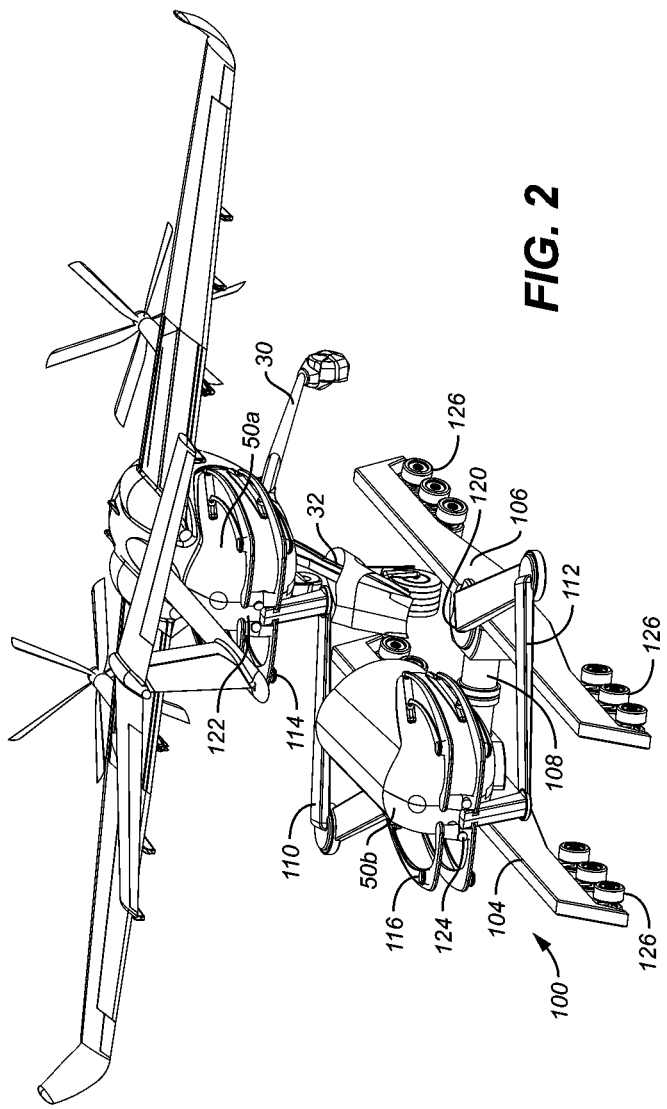
FIG. 2 is an upper right rear perspective view of the cargo bin swapping system in the same configuration as that of FIG. 1.
Figure 3:
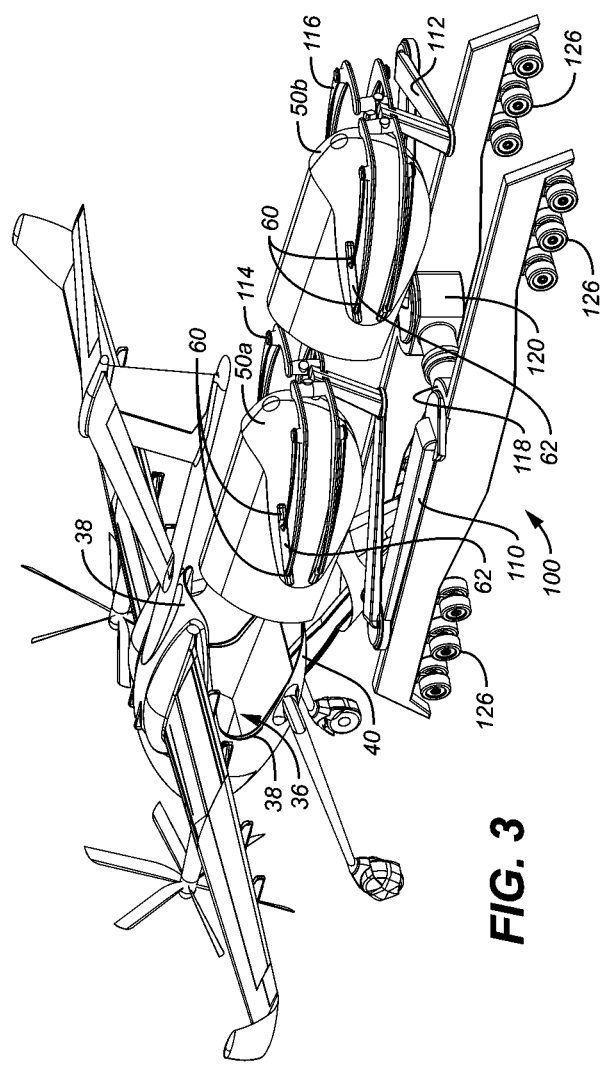
FIG. 3 is an upper left rear perspective view showing the cargo bin swapping system having detached and separated a cargo bin from an ESTOL aircraft in preparation for replacing the bin with a second cargo bin, which is shown disposed behind the removed cargo bin.
Figure 4:
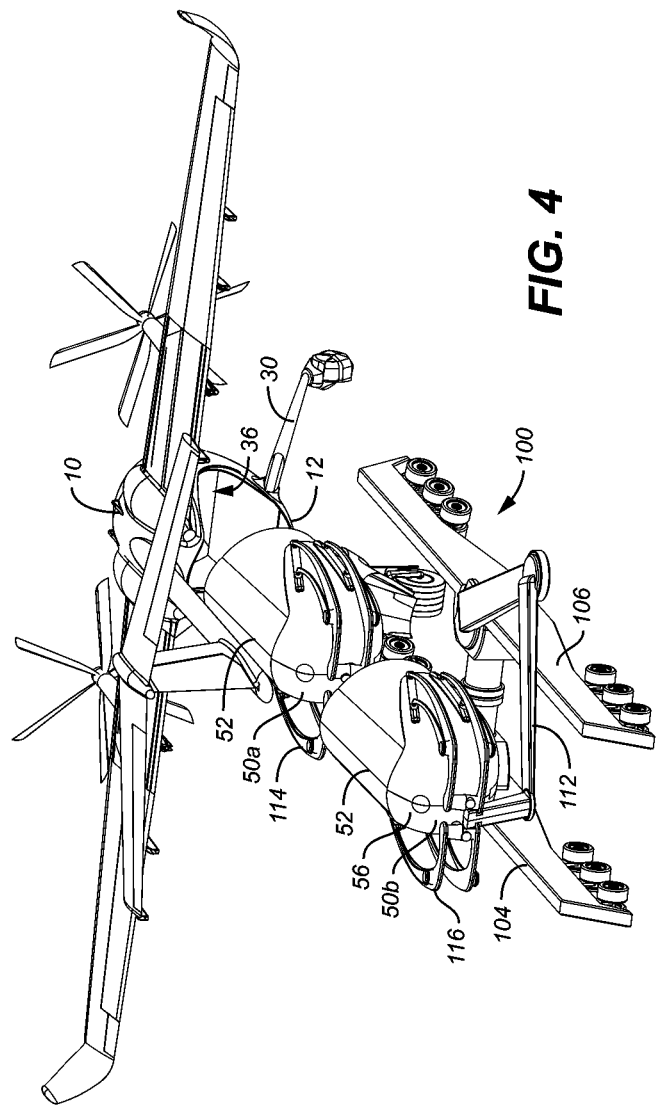
FIG. 4 is an upper right rear perspective view thereof.
Figure 5:
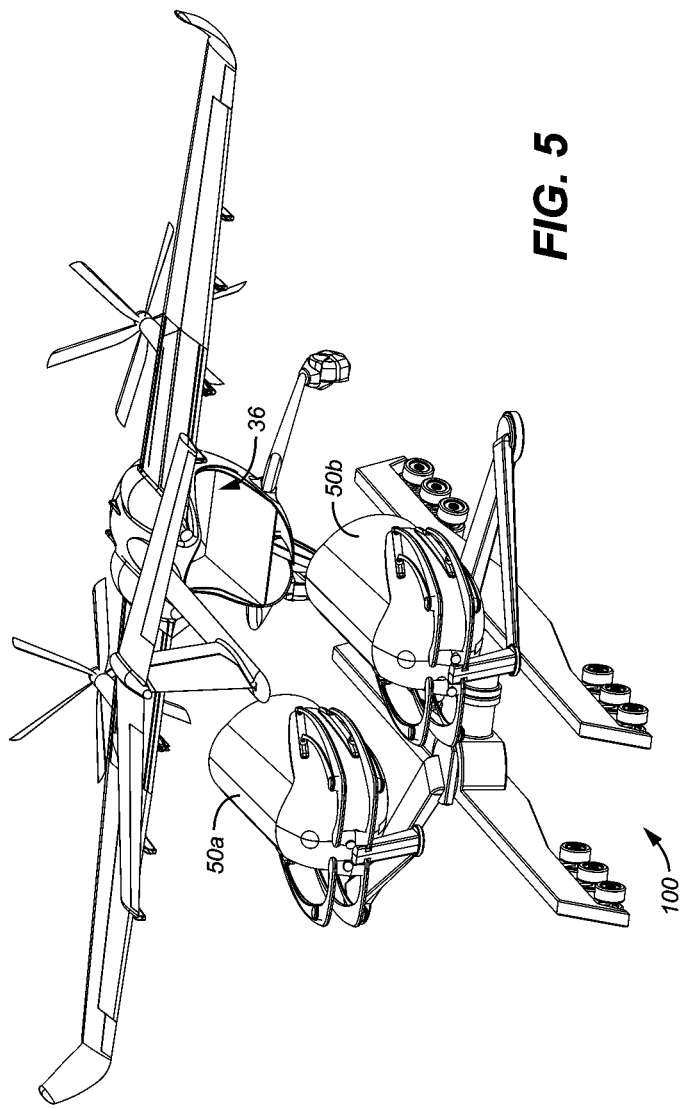
FIG. 5 is an upper right rear perspective view showing the removal and replacement operation having progressed such that the removed cargo bin is cleared out and away from the ESTOL so that the replacement bin can be moved forward and inserted in place.
Figure 6:
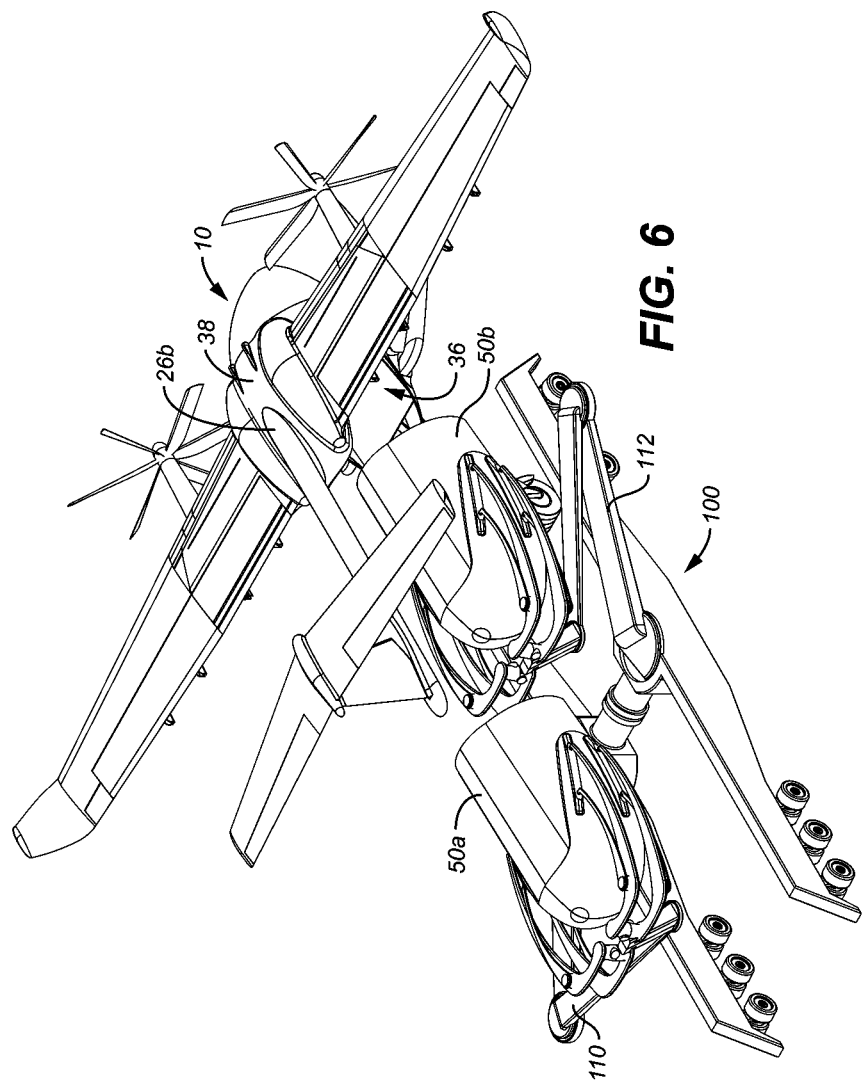
FIG. 6 is an upper right rear perspective view showing the removal and replacement operation having progressed still further, with the replacement bin now being moved into alignment with the aircraft for coupling to the aft portion of the airframe.
Figure 7:
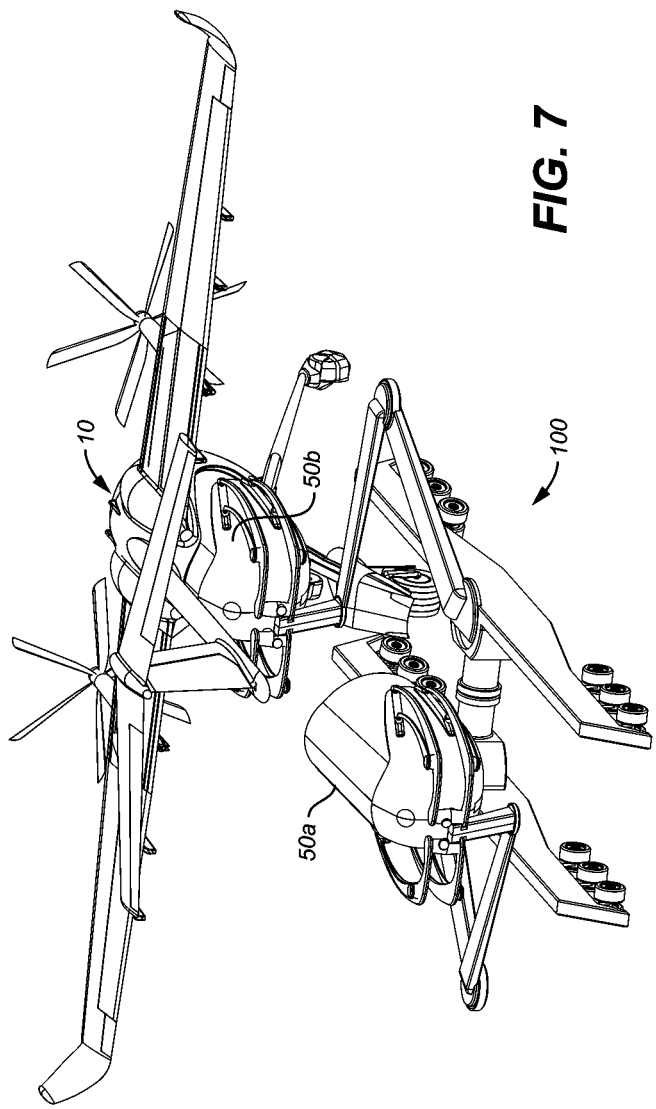
FIG. 7 is an upper right rear perspective view showing the replacement cargo bin having been joined to the airframe and thus forming a functional part of the fuselage.
Figure 8:
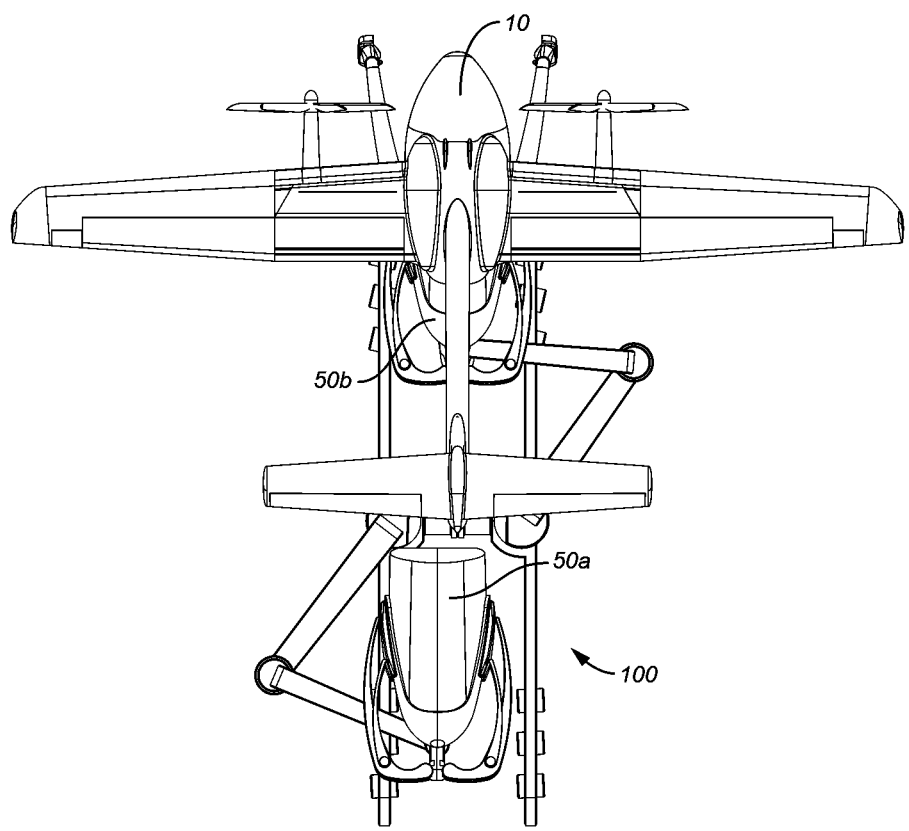
FIG. 8 is a top plan view thereof.

Referring to FIGS. 1 through 8, wherein like reference numerals refer to like components in the various views, there is illustrated therein a new and improved urban air mobility aircraft 10 configured for use with an inventive cargo module swapping system and apparatus, the latter generally denominated 100 herein. FIGS. 1-8 illustrate an embodiment of the inventive aircraft and cargo bin swapping system and apparatus. As will be seen, alternative embodiments achieving substantially the same features and functions are contemplated and described.

In general terms, the UAM aircraft 10 configured and adapted for use with the cargo swapping system includes a forward portion 12 of a central fuselage ("front fuselage" herein) supports left and right wings 14 and 16. An empennage (tail wing assembly) 18 includes elevators 20 and a tailfin/rudder 22 and is preferably a high-wing design when configured for cargo.

The front fuselage 12 in preferred embodiments includes a cockpit 24 having a globular windscreen. The front fuselage includes an attachment point for an axially disposed aft frame member 26 that supports the tail assembly at its distal end 26a, with its proximal end 26b joined at the common wing junction above the globular cockpit.

In preferred embodiments the front landing gear 30 deploys from a bottom of the front fuselage 12 and includes a pair of driven struts on opposing port and starboard sides of the fuselage. A rear landing gear strut 32 also deploys rearward and downward from the front fuselage.

The front fuselage 12 extends rearward to a break or bifurcation behind the tail assembly frame member and the front and rear landing gear struts. It is thus entirely open at the rear, the opening 36 being substantially cylindrical in shape and having side cuts or scallops and provide a functional amount of flex in the upper and lower portions 38, 40 of the front fuselage 12, which features cooperate to facilitate insertion of an aft portion of the central fuselage, configured as a removable cargo bin. The break is defined by a smoothly shaped edge 34 that serves as a mating surface for a ridge disposed on the surface of the removable cargo bin 50, described in more detail below. The opening and its elements and features are shown most clearly in FIGS. 3-6.

As can be seen in the views, the cargo bin connects to the aft portion of the front fuselage and effectively comprises the aft fuselage. Importantly, it can be decoupled from the front fuselage. Indeed, that is a salient feature of the present invention. To achieve that end, the cargo bin 50 is configured with a cylindrical male portion 52 which slidably inserts into the rear opening 36 in the forward portion of the central fuselage. The male portion extends rearward to a raised ridge 54 configured to mate and seal with the shaped edge 34 on the forward portion 12 of the central fuselage. The male portion is dimensioned with tight clearances from the interior walls of the front fuselage to engage and approximate the sides, and so as to continue and contribute to the proper distribution of sheer and torsional loads during flight. When inserted into the front fuselage, the cargo bin complements the front fuselage to complete the full enclosure provided by the fuselage shell. Additionally, the rearmost portion of the cargo bin 56, elevated above the male portion by the width of the raised ridge 54, provides continuity in the fuselage exterior surface from the front fuselage to and along the surface of the cargo bin. Other than the seam created by the mated shaped edge 34 of the front fuselage and the raised ridge 54 of the cargo bin, the fuselage surface 58 is a continuous, smooth, and unbroken aerodynamic surface.

The cargo bin exterior surface includes fittings 60, preferably including two pairs of opposing fittings (upper and lower sets of opposing pairs) disposed on each of the port and starboard sides of the cargo bin either on the exterior surface of the cargo bin or set within a recess or channel 62 at a slight subsurface level.

In embodiments, insertion, removal, and replacement of the above-described cargo bin in the ESTOL aircraft is accomplished using an autonomous robotic vehicle and material handler 100 (denominated a "swapping robot" herein). Numerous configurations are contemplated, but all must realize the essential functions of carrying, positioning, orienting, aligning, inserting, and removing cargo bins from ESTOLS parked anywhere on or near an airfield (on a runway, taxiway, tarmac, apron, ramp, hangar, helipad, and the like). In embodiments, these functions can be carried out using an autonomous mobile platform 102 having first and second (port and starboard) longitudinal beams 104, 106, respectively, connected by a medial transverse beam 108. The longitudinal beams each support a segmented robotic arm 110, 112 mounted at each end of the transverse beam, the segmented arms each comprising three stacked swiveling segments, the uppermost segment terminating in a material handling grip 114, 116 having an end coupling element that engages the fittings 60 on the cargo bin surface. The end coupling element may comprise a finger for inserting into a fitting hole, or a clamp to engage a tab, or an electromagnet to clamp a ferromagnetic fitting, or a suction device, or any of a number of suitable elements having sufficient bearing strength to hold and manipulate a maximally loaded cargo bin.

The segmented arms are driven electrically, pneumatically, or hydraulically by actuator pumps or motors 118, 120 disposed on the platform. Grips 114, 116 are operated, opening to disengage from fittings 60 and closing to engage and grasp fittings 60, by actuators or motors 122, 124 disposed on the uppermost portion of the segment arms.

Each beam also includes a plurality of driven, steerable wheels, preferably deployed in pairs on wheel bogies or trucks 126. In embodiments, all wheels may be driven; in alternative embodiments some wheels may be casters.

Control and positioning of the swapping robot and its mechanical arms is accomplished using a controller either on site or network connected, in signal communication with the swapping robot, and programmed to autonomously move cargo bins from a holding area to a parked ESTOL, position and align the swapping robot in relation to the ESTOL (for instance, with the longitudinal beams straddling the rear landing gear of the aircraft, and then to remove an attached cargo bin and replace it by inserting a replacement cargo bin. When latches or locks secure the replaced cargo bin on the aircraft, the swapping operation is completed, and the swapping robot can return under programmed control to an on-field hangar, warehouse, shipping transfer area, or other area suitable for transferring cargo from or into the removed cargo bin. Such control systems are increasingly well known in material handling and warehouse inventor management and article movement, and the features and functions of a control system are well within the knowledge of those with skill in the relevant art and are not a critical part of the novel and inventive steps in the claimed invention.

As described herein, each embodiment of the inventive cargo bin swapping system of the present invention includes an ESTOL aircraft having a central fuselage with a forward portion with a cockpit, front and rear landing gear, and a tail assembly, and configured for selectively coupling to and decoupling from one of a plurality of cargo bins, each configured to function as the aft portion of the central fuselage; and a swapping robot, which is, more specifically, an autonomously driven robotic vehicle and material handler, for transporting, carrying, positioning, orienting, aligning, inserting, and removing cargo bins to and from the forward portion of the ESTOL.

The foregoing disclosure is sufficient to enable those with skill in the relevant art to practice the invention without undue experimentation. The disclosure further provides the best mode of practicing the invention now contemplated by the inventor. While the particular cargo swapping system and method shown and disclosed in detail are fully capable of attaining the objects and providing the advantages stated herein, it is to be understood that they are merely illustrative of the presently preferred embodiments of the invention and that no limitations are intended to the detail of construction or design herein shown other than as defined in the appended claims. Accordingly, the proper scope of the present invention should be determined only by the broadest interpretation of the appended claims so as to encompass all such modifications as well as all relationships equivalent to those illustrated in the drawings and described in the specification.

What is claimed as invention is:

1. A cargo bin swapping system for an electric short take-off and landing (ESTOL) aircraft, comprising:
   an ESTOL aircraft having a central fuselage with a forward portion with a cockpit, front and rear landing gear, and a tail assembly, and configured for selectively coupling to an decoupling from one of a plurality of cargo bins, each configured to function as the aft portion of the central fuselage;
   a swapping robot, namely an autonomously driven robotic vehicle and material handler, for transporting, carrying, positioning, orienting, aligning, inserting, and removing cargo bins to and from said forward portion of said ESTOL; and
   wherein said swapping robot further comprises:
      an autonomously maneuverable mobile platform on wheels; and
      first and second spaced apart robotic arms disposed on said platform, each of said robotic arms having a grip configured with an end coupling element to engage and operate coupling fittings on said cargo bin to enable placement and removal of said cargo bin from said forward portion and to hold said cargo bin during transport.

2. The cargo bin swapping system of claim 1, wherein said forward portion of said fuselage extends rearward to a bifurcation behind a tail assembly frame member and front and rear landing gear struts to an opening in said forward portion configured to accept the insertion of a male portion of a cargo bin.

3. The cargo bin swapping system of claim 2, wherein said cargo bin is configured with a male portion which slidably inserts into the rear opening in said forward portion of said central fuselage.

4. The cargo bin swapping system of claim 3, wherein said male portion of said cargo bin extends rearward to a raised ridge configured to mate and seal with a shaped edge on said forward portion of said central fuselage.

5. The cargo bin swapping system of claim 2, wherein said male portion is dimensioned with exterior sides configured to engage interior walls in said forward portion to contribute to the distribution of sheer and torsional loads during flight.

6. The cargo bin swapping system of claim 2, wherein said cargo bin complements said forward portion to complete a full enclosure of a central fuselage shell.

7. The cargo bin swapping system of claim 2, wherein said cargo bin includes fittings on opposing sides of said cargo bin to fasten to coupling element on said forward portion.

8. The cargo bin swapping system of claim 1, wherein said robotic arms are stacked segmented arms comprising a plurality of swiveling segments with an uppermost segment terminating in a material handling grip.

9. The cargo bin swapping system of claim 8, wherein said robotic arms are driven by electrical motors.

10. The cargo bin swapping system of claim 8, wherein said robotic arms are driven by pneumatic or hydraulic actuators.

11. The cargo bin swapping system of claim 1, wherein said mobile platform includes first and second longitudinally oriented beams connected by at least one transverse beam.

12. The cargo bin swapping system of claim 11, wherein each of said longitudinally oriented beams includes a plurality of driven, steerable wheels.

13. The cargo bin swapping system of claim 1, further including a controller to control and position said swapping robot and said robotic arms.

14. The cargo bin swapping system of claim 13, wherein said controller is programmed to autonomously move cargo bins from a cargo bin holding area to a parked ESTOL, position and align swapping robot in relation to parked ESTOL, remove an attached cargo bin, and replace the removed cargo bin by inserting a replacement cargo bin.

* * * * *